United States Patent
Mitchell et al.

(10) Patent No.: US 12,234,943 B2
(45) Date of Patent: Feb. 25, 2025

(54) TEMPORARY SUPPORT STAND FOR A VOLUMETRIC MODULAR UNIT

(71) Applicant: ModCribs, LLC, Telluride, CO (US)

(72) Inventors: Matthew Robert Mitchell, Telluride, CO (US); Scott Robert Bridger, Telluride, CO (US)

(73) Assignee: MODCRIBS, LLC, Telluride, CO (US)

( * ) Notice: Subject to any disclaimer, the term of this patent is extended or adjusted under 35 U.S.C. 154(b) by 0 days.

(21) Appl. No.: 18/045,374

(22) Filed: Oct. 10, 2022

(65) Prior Publication Data

US 2023/0116868 A1    Apr. 13, 2023

Related U.S. Application Data

(62) Division of application No. 16/876,431, filed on May 18, 2020, now Pat. No. 11,466,810.

(51) Int. Cl.
*F16M 11/22*     (2006.01)
*E02D 27/00*     (2006.01)
(Continued)

(52) U.S. Cl.
CPC ............ *F16M 11/22* (2013.01); *F16M 11/24* (2013.01); *B66F 7/26* (2013.01); *E02D 27/00* (2013.01); *E04C 3/30* (2013.01); *F16M 2200/08* (2013.01)

(58) Field of Classification Search
CPC .... F16M 11/22; F16M 11/24; F16M 2200/08; B66F 7/00; E04C 3/30; E02D 27/00; E02D 27/43
See application file for complete search history.

(56) References Cited

U.S. PATENT DOCUMENTS

| | | | |
|---|---|---|---|
| 3,493,209 A | | 2/1970 | Brammer |
| 3,578,177 A | * | 5/1971 | Paden ........................ B60S 9/06 |
| | | | 211/49.1 |

(Continued)

FOREIGN PATENT DOCUMENTS

| | | |
|---|---|---|
| CN | 202519926 U | 11/2012 |
| JP | 5155347 B2 | 3/2013 |

OTHER PUBLICATIONS

International Search Report and Written Opinion, PCT/US21/32991, Aug. 18, 2021, 14 Pages.

*Primary Examiner* — Tan Le
(74) *Attorney, Agent, or Firm* — Goodhue, Coleman & Owens, P.C.

(57) ABSTRACT

A support stand for supporting a volumetric modular unit above the ground is disclosed. The support stand includes a top portion with a top surface for contacting and supporting an underside of the modular unit above the ground. A bottom portion with a bottom surface supports the top portion at an elevation above the ground against the underside of the modular unit. An elevating portion has a top side connected to the top portion, a bottom side connected to the bottom portion, and an elevating span between the top side and the bottom side. A pad is connected to the bottom portion. The pad has a bottom surface for contacting and supporting the bottom portion against the ground, an inner pad perimeter and an outer pad perimeter. The top surface is parallel with the bottom surface. The underside and weight of the modular unit is supported on the top surface.

20 Claims, 17 Drawing Sheets

(51) Int. Cl.
  *E04C 3/00*   (2006.01)
  *F16M 11/24*   (2006.01)
  *B66F 7/26*   (2006.01)
  *E04C 3/30*   (2006.01)

(56) References Cited

U.S. PATENT DOCUMENTS

| | | | |
|---|---|---|---|
| 4,014,517 A | | 3/1977 | Keagle |
| 4,856,747 A | * | 8/1989 | Gano .................... F16M 11/22 248/354.7 |
| 4,937,989 A | | 7/1990 | Miyares et al. |
| 6,219,981 B1 | | 4/2001 | Bergelt |
| 6,518,499 B1 | * | 2/2003 | Kessler ................... F16M 5/00 174/37 |
| D493,096 S | | 7/2004 | Sittig |
| 7,207,548 B1 | * | 4/2007 | Howe ................. F21V 33/0084 254/98 |
| 7,441,731 B2 | | 10/2008 | Smart et al. |
| 7,451,580 B2 | * | 11/2008 | Kelly ....................... E04C 5/20 D25/199 |
| D733,540 S | * | 7/2015 | Merey ........................... D8/374 |
| D734,135 S | * | 7/2015 | Merey ........................... D8/374 |
| D812,784 S | | 3/2018 | Owens |
| 10,532,260 B2 | | 1/2020 | Monte |
| D984,250 S | * | 4/2023 | Lin ................ D8/374 |
| 2003/0047658 A1 | | 3/2003 | Peter et al. |
| 2005/0121584 A1 | * | 6/2005 | Hartmann ................ B66F 1/04 248/352 |
| 2006/0071139 A1 | | 4/2006 | Lemirande |

\* cited by examiner

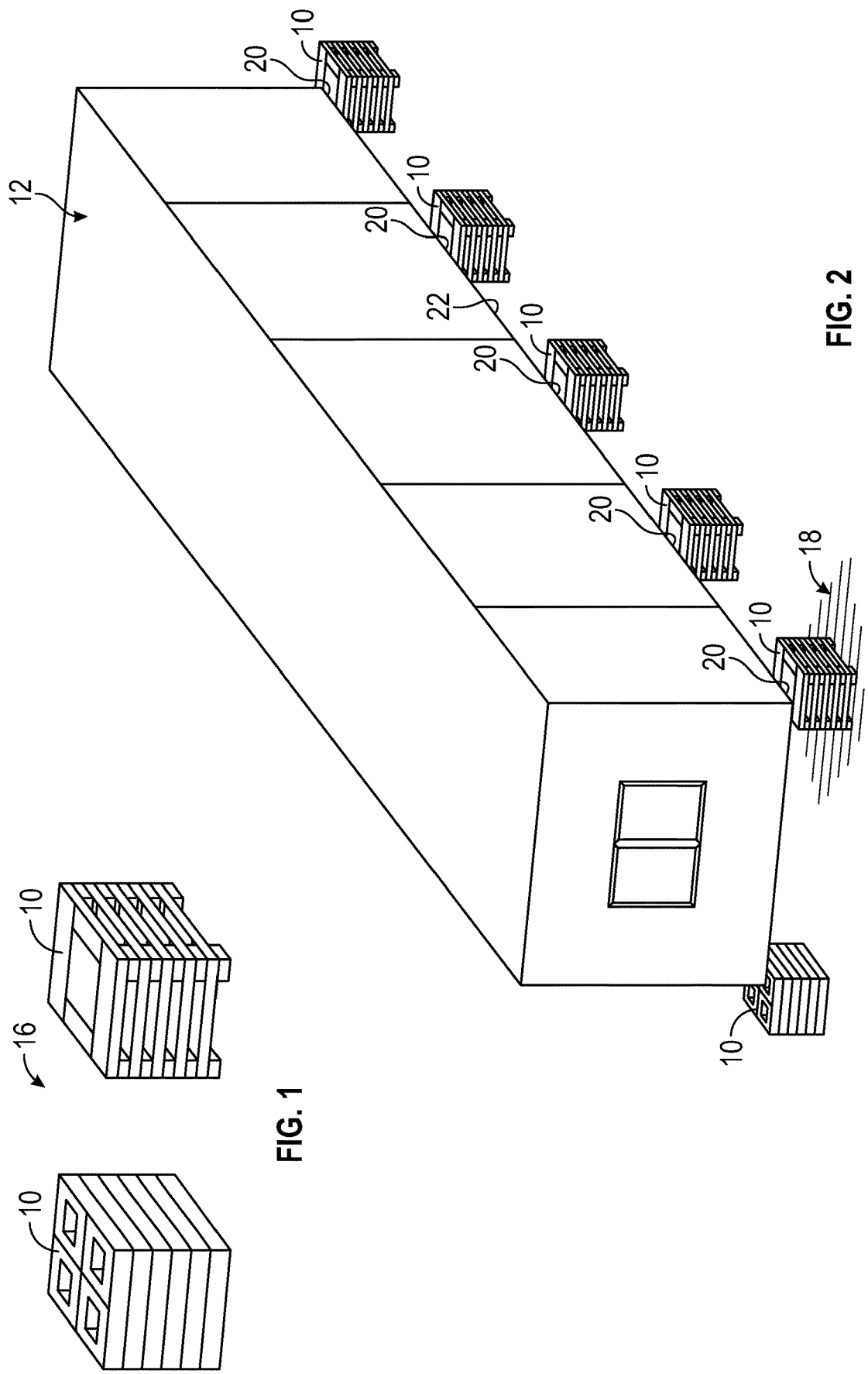

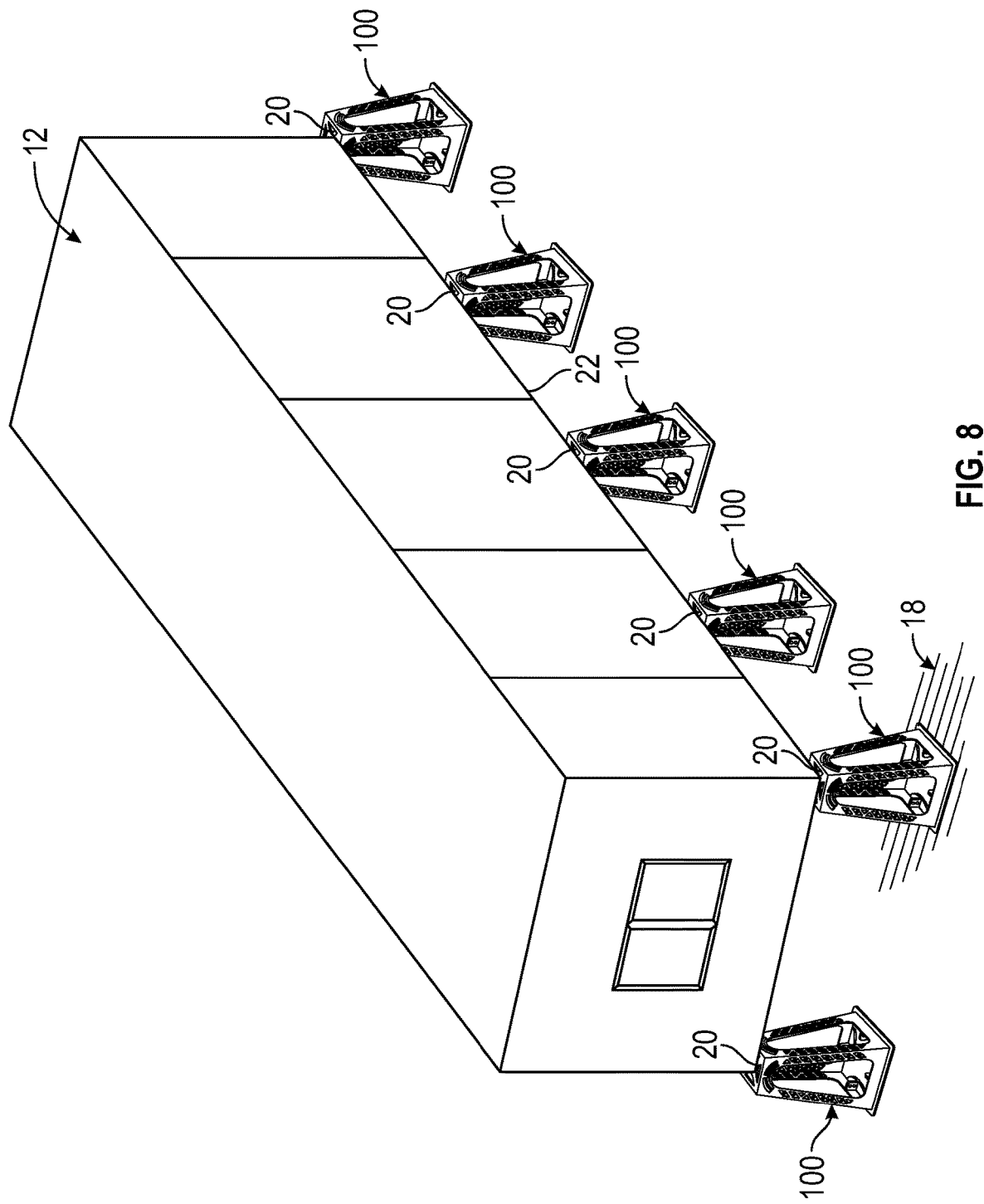

TEMPORARY SUPPORT STAND FOR A VOLUMETRIC MODULAR UNIT

CROSS-REFERENCE TO RELATED APPLICATIONS

This application is a divisional of U.S. non-provisional application Ser. No. 16/876,431 filed May 18, 2020, which is incorporated by reference in its entirety.

FIELD OF THE INVENTION

The present invention relates to a temporary support stand(s) for supporting modular units above a surface. More particularly, but not exclusively, the present invention relates to stackable, reusable, quickly deployable, easily transportable, temporary support stand for supporting a volumetric modular unit above a surface.

BACKGROUND

The modular construction industry is currently utilizing wood temporary support stands, or "cribs" as they are commonly known, to elevate modular units at roughly 36" above the ground. This occurs as the units are being stored at the manufacturing facility, at storage yards, or on construction sites prior to being lifted by a crane onto the final foundation. Current stands are expensive and labor intensive to build. They are also very heavy, awkward and difficult to adjust, move and lift. The weight of wood cribs also means they are physically taxing on workers to move into and out of position underneath a modular unit. Current stands are also expensive to transport due to volume of space each one occupies. To transport them in a manner that takes less space would require time and resources breaking them down into more manageable pieces.

The average commercial (hospitality or multi-family) project can require 500 to 1,000 support stands for supporting modular units over the course of a project. The hauling capacity needed for this many support stands, as currently configured, requires multiple semi-tractor trailer loads, resulting in unnecessary expenses, loss of time and additional burdens on a project site. Moreover, the storage area required is significant due to the unnecessary space current stands occupy. Additionally, the materials used for current stands is not durable. Because they are often made of wood, they deteriorate rapidly from exposure to the elements and can be rendered useless given the weight they are required to support. Current stands are also prone to break and be damage from use and while storing, moving and transporting them. The stability, dependability and performance consistency of each support stand is also subject to the quality of the craftsmanship and materials during their construction, which varies greatly given current stand designs, materials, manufacturing and assembly processes. The manufacturing and construction of current stands is rarely, if ever, engineered or inspected. Typically, current stands are simply being constructed by truss manufacturers or general contractors, without engineered drawings, then disposed of at the end of the project because they are impractical and cumbersome to transport, store and reuse. This is problem is further exacerbated given that most companies are not immediately building another modular project where the support stands could be reused.

Therefore, what is needed is a support stand for modular units that overcomes all the deficiencies in current stand designs, materials and practices.

SUMMARY

Therefore, it is a primary object, feature, or advantage of the present invention to improve over the state of the art.

It is a further object, feature, or advantage of the present invention to provide stackable, reusable, quickly deployable, easily transportable, temporary support stand for supporting a volumetric modular unit above a surface, such as the ground.

It is a still further object, feature, or advantage of the present invention to provide a support stand for modular units constructed according to engineering specifications, consistent in craftsmanship and from highly durable materials.

Another object, feature, or advantage is to provide a support stand for modular units that is fully engineered, tested and inspected for quality and performance, thereby providing assurance of safety during use.

Yet another object, feature, or advantage is to provide for the sale and/or rental of support stands for modular units.

Still another object, feature, or advantage is to provide a support stand for modular units that occupies significantly less space to transport and store.

One other object, feature, or advantage is to provide a support stand for modular units that is significantly lighter than current stands reducing the risk of injury, damage and overall wear and tear to a project site, storage site, or building site.

According to one exemplary aspect of the disclosure, a support stand for supporting a modular unit above the ground is disclosed. The support stand includes, in at least one exemplary aspect, a top portion with a top surface for contacting and supporting an underside portion of the modular unit above the ground. The top portion has a top perimeter. A bottom portion with a bottom surface supports the top portion at an elevation above the ground against the underside portion of the modular unit. The bottom portion has a bottom perimeter larger than the top perimeter. An elevating portion has a top side connected to the top portion, a bottom side connected to the bottom portion, and an elevating span between the top side and the bottom side. According to at least one aspect, the top surface is parallel with the bottom surface and the underside and weight of the modular unit is supported on the top surface.

According to one exemplary aspect of the disclosure, a support stand for supporting a modular unit above the ground is disclosed. The support stand includes, in at least one exemplary aspect, a top portion has a top surface for contacting and supporting an underside portion of the modular unit above the ground. The top portion has a top perimeter. A bottom portion supports the top portion at an elevation above the ground against the underside portion of the modular unit. The bottom portion has a bottom perimeter larger than the top perimeter. An elevating portion has a top side connected to the top portion, a bottom side connected to the bottom portion, and an elevating span between the top side and the bottom side. One or more openings in the elevating portion extend generally between the top side and the bottom side. The one or more openings have a bottom edge and a top edge. A pad is connected to the bottom portion. The pad has a bottom surface for contacting and supporting the bottom portion against the ground, an inner pad perimeter and an outer pad perimeter. One or more interference components, such as protrusions extend inwardly from the inner pad perimeter. The one or more protrusions have a bottom surface for contacting and supporting the bottom portion against the ground during use and for contacting the bottom edge of one of the one or more openings when two or more support stands are stacked together one on top of the other. In one aspect, the outer pad perimeter is greater than the bottom perimeter and the inner pad perimeter is less than the bottom perimeter.

According to one exemplary aspect of the disclosure, a method for temporarily supporting a volumetric modular unit above the ground with support stands and stacking the support stands when not supporting the volumetric modular unit is disclosed. The method includes, in at least one exemplary aspect, providing a support stand having a top portion with a top surface, a bottom portion having a bottom surface, an elevating portion having a top side connected to the top portion, a bottom side connected to the bottom portion, and an elevating span between the top side and the bottom side. The top portion has a top perimeter and the bottom portion has a bottom perimeter larger than the top perimeter. The volumetric modular unit is lifted to an elevation above the ground and a height of the support stand. A plurality of support stands are unstacked. A support stand is placed underneath the volumetric modular unit at each modular support point with the bottom of the support stand for contacting and supporting an underside of the modular unit above the ground. The volumetric modular unit is lowered onto each support stand, bringing each modular support point into supporting contact with the top surface for supporting the volumetric modular unit on the top surface of each support stand above the ground. The volumetric modular unit is temporarily supported at the height of each support stand above the ground. The volumetric modular unit is set by lifting the volumetric modular unit off of each support stand for building a modular constructed building.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

FIG. 1 is a perspective view of known support stands for a modular unit.

FIG. 2 is a perspective view of known support stands used for supporting a modular unit.

FIG. 8 is a perspective view of a plurality of support stands supporting a modular unit above a surface.

DETAILED DESCRIPTION

Figure 3:
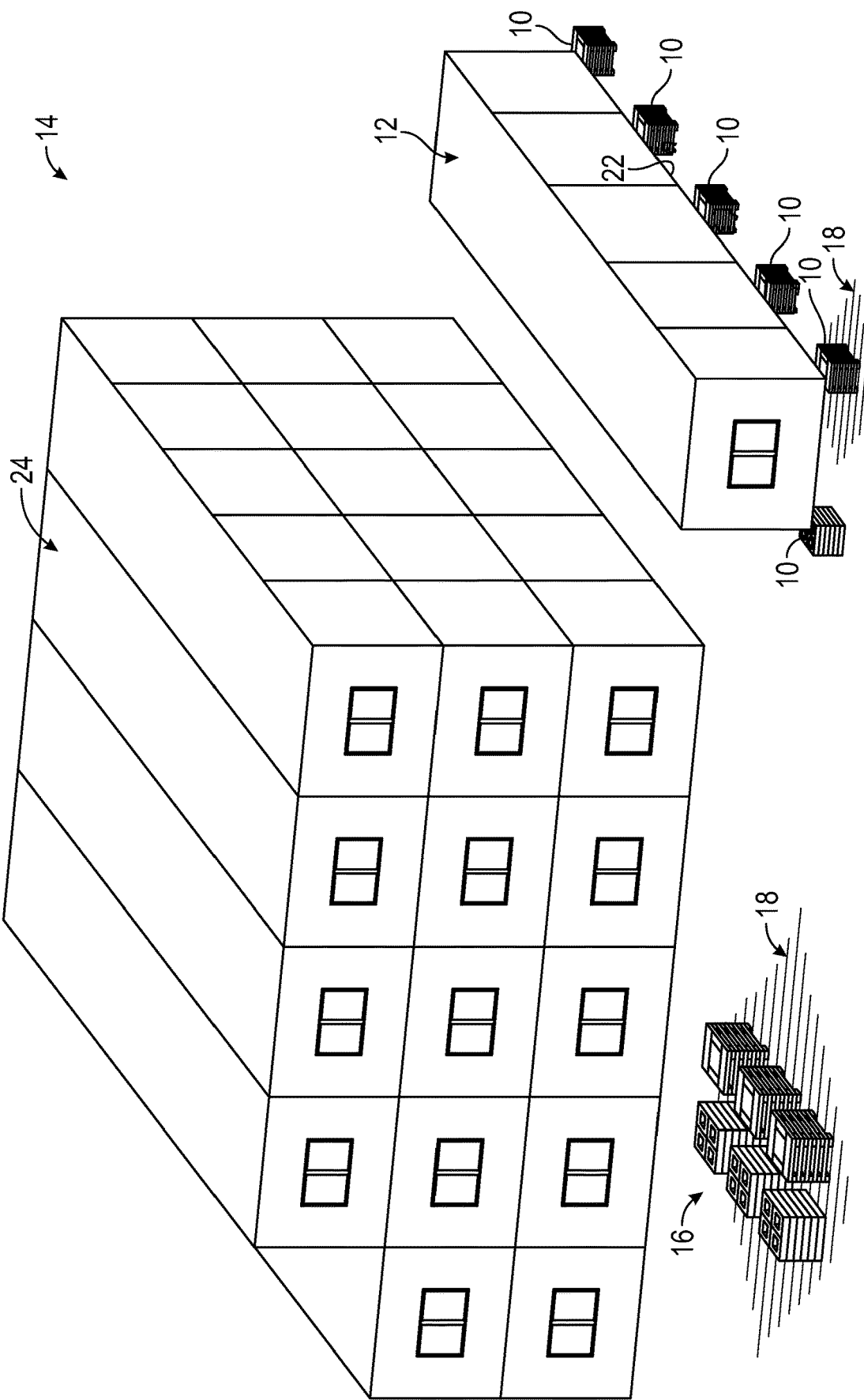
FIG. 3 is a perspective view of a building constructed from modular units.
Figure 5:
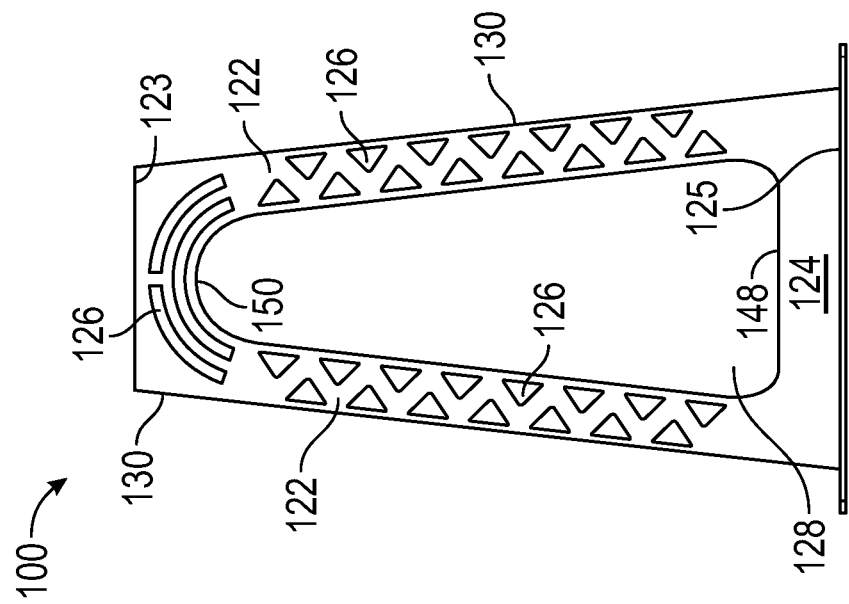
FIG. 5 is front side view of the support stand shown in FIG. 4 with the other sides being a mirror image.
Figure 4:
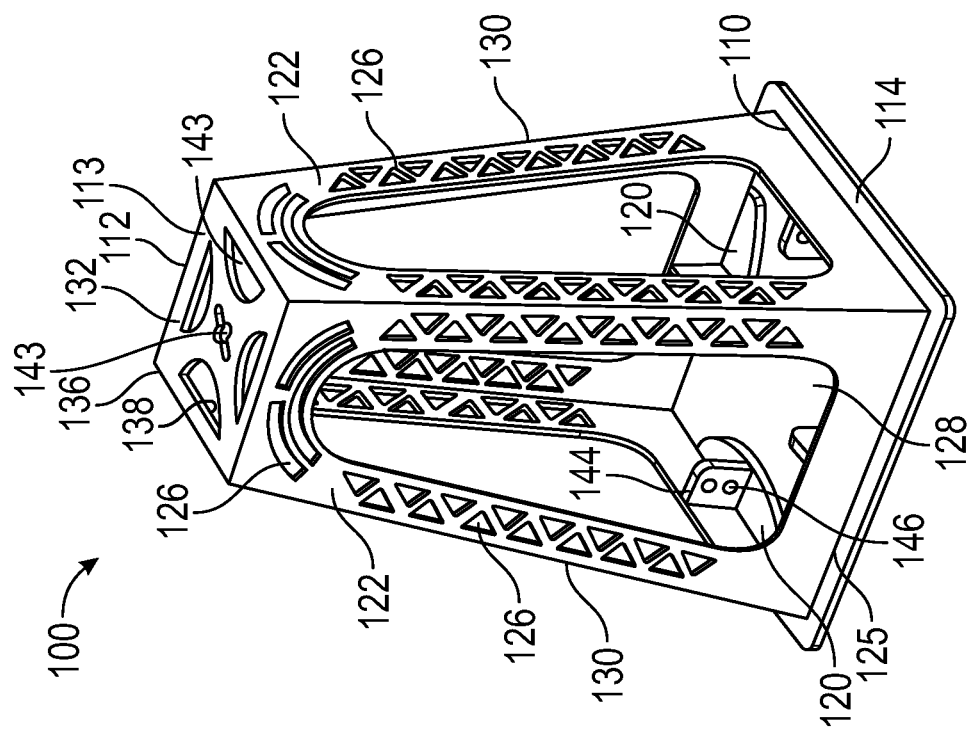
FIG. 4 is a perspective view of a support stand in accordance with an illustrative aspect of the disclosure.
Figure 6A:
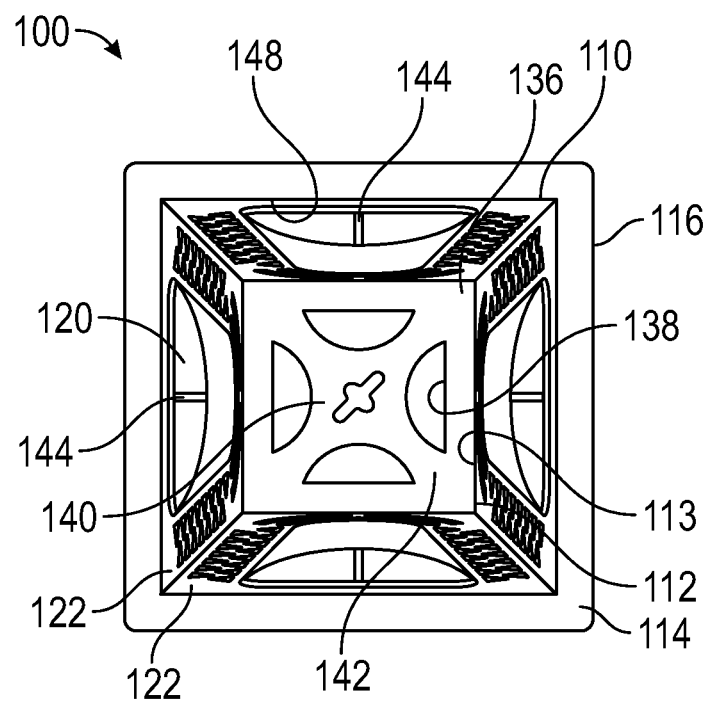
FIG. 6A is top view of the support stand shown in FIG. 4.
Figure 6B:
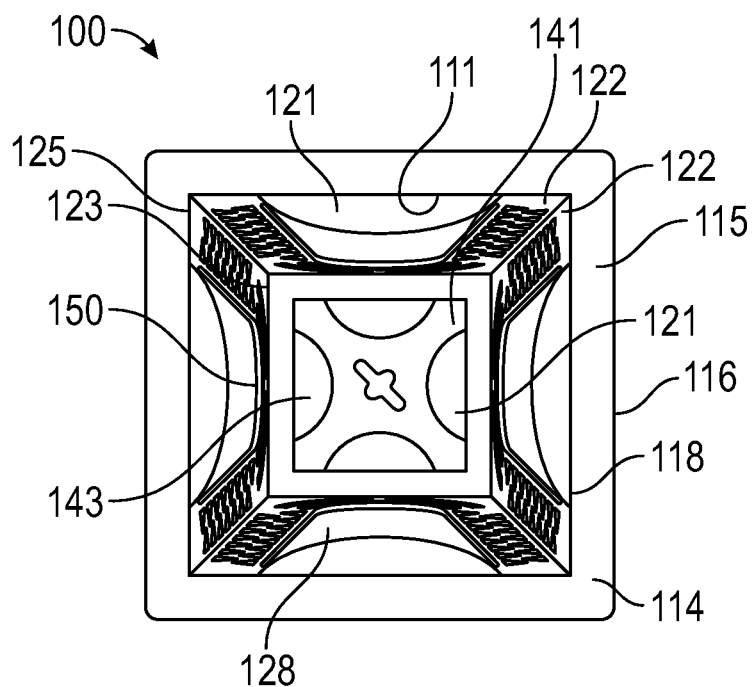
FIG. 6B is a bottom view of the support stand shown in FIG. 4.

The modular construction industry is currently utilizing wood temporary support stands 10, or "cribs" as they are commonly known, to elevate modular units at roughly 36" above the ground. FIGS. 1-3 provide perspective views of such support stands known to be used for supporting a volumetric modular unit 12 above the ground 18 by positioning them at modular support points 20 on the underside 22 of the volumetric modular unit 12. Modular units, such as modular unit 12, are often stored at the manufacturing facility, at storage yards, or on construction sites prior to being lifted by a crane onto the final foundation. Current stands 10 are expensive and labor intensive to build. They are also very heavy, awkward and difficult to adjust, move and lift. The weight of current stand 10 designs and construction also means they are physically taxing on workers to move into and out of position underneath a modular unit 12. Current stands 10 are also expensive to transport due to volume of space each one occupies. To transport current stands 10 in a manner that takes less space would require time and resources breaking them down into more manageable pieces.

The average commercial (hospitality or multi-family) project site 14 can require 500 to 1,000 support stands 10 for supporting modular units 12 over the course of a project. The hauling capacity needed for this many support stands 10 requires multiple semi-tractor trailer loads, resulting in unnecessary expenses, loss of time and additional burdens on a project site 14. Moreover, the storage area 16 required is significant due to the unnecessary space current stands 10 occupy. Additionally, the materials used for current stands 10 is not durable. Because they are often made of wood, they deteriorate rapidly from exposure to the elements and can be rendered useless, thereby having a short useful lifespan, given the weight they are required to support. Current stands 10 are also prone to break and be damage from use and while storing, moving and transporting them. The stability, dependability and performance consistency of each support stand 10 is also subject to the quality of the craftsmanship and materials during their construction, which varies greatly given current stand designs, materials, manufacturing and assembly processes. The manufacturing and construction of current stands 10 is rarely, if ever, engineered or inspected.

Typically, current stands 10 are simply being constructed by truss manufacturers or general contractors, without engineered drawings, then disposed of at the end of the project because they are impractical and cumbersome to transport, store and reuse. This is problem is further exacerbated given that most companies are not immediately building another modular project site 14 where the support stands 10 could be reused.

Therefore, what is needed in the volumetric modular unit art is a support stand 100 that is stackable, reusable, quickly deployable, easily transportable, thereby facilitating temporary or longer term support for supporting a volumetric modular unit 12 above a surface, such as the ground 18, as best illustrated in FIGS. 4-20.

Support stand 100 includes base 110 and an opposing top 112. Base 110 can include a pad 114 or foot that extends peripherally outwardly outside from the base 110. Pad 114 can also extend peripherally inwardly inside the base 110. Pad 114 can extend both peripherally inwardly and outwardly from the base 110 of stand 100. Pad 114 terminates in an outer edge 116 that extends peripherally outwardly away from the base 110 for stacking, supporting and stabilizing stand 100. Pad 114 can also be configured to terminate in an inner edge 118 that extends peripherally inwardly away from the base 110 for stacking, supporting and stabilizing stand 100. In one aspect, outer edge 116 is separated from the base 110 by a constant distance. In another aspect, the distance between base 110 and outer edge 116 varies about the periphery of the base 110. In one aspect, inner edge 118 is separated from the base 110 by a constant distance. In another aspect, the distance between base 110 and inner edge 118 varies about the periphery of the base 110. The outer edge 116 can terminate contiguous with the base 110 or extend outwardly from the base 110 as described. Similarly, the inner edge 118 can terminate contiguous with the base 110 or extend inwardly from the base 110 as described. Pad 114 may be a continuous pad occupying and extending from an entirety of the base 110. Pad 114 may be a discontinuous pad occupying and extending from only portions of the base 110. Pad 114 can be configured with three or more sides operably connected to the base 110. Pad 114 can be configured in a polygonal shape operably connected to the base 110. Pad 114 can be configured having a generally circular shape, with outer edge 116 forming the outer circumference of pad 114 and inner edge 118 forming the inner circumference of pad 114. Similarly, pad 114 can be a spherical, polygonal, or oblong shape, with the outer edge 116 forming the outer circumference of pad 114 and the inner edge 118 forming the inner circumference of pad 114 providing additional surface area in contact with ground 18. A portion of the inner edge 118 can be configured to extend inwardly further than or the same distance as other portions of the inner edge 118 about the periphery of the base 110. In one aspect, interference components, such as protrusion(s) 120 may be configured to extend inwardly from the base 110 for controlling the mating depth of stands 100 when stacked together, one on top of the other. Protrusion(s) 120 can also provide additional support to the base 110 during use by providing additional surface area in contact with ground 18. Pad 114 can be constructed from aluminum or other castable or non-castable alloys and metals. Pad 114 can be constructed from two or more different types of materials, one part of pad 114 being metal and another part of pad 114 being non-metal, such as a moldable rubber or plastic. In another aspect, pad 114 can be constructed from a composite material.

Support stand 100 also includes legs 122 extending upwardly from the base 110. The legs 122 can be configured to extend vertically from the base 110. The legs can also be configured to extend at an angle relative to vertical, ranging from 2°-4°, 3°-6°, 4°-8°, 2°-7°, and 4°-10°. In one aspect, legs 122 can be configured to extend at an angle relative to vertical, ranging from 4.5°-4.8°. Support stand 100 can be configured with two legs 122, three legs 122, four legs 122, five legs 122, six legs 122, seven legs 122, eight legs 122, nine legs 122, ten legs 122, eleven legs 122, twelve legs 122, thirteen legs 122, fourteen legs 122, fifteen legs 122, sixteen legs 122 or any number of legs 122. For example, a side of the support stand 100 can be configured with a leg 122 that includes one, multiple or many leg portions forming at least one leg 122 of support stand 100. Legs 122 can be angled relative to each other. For example, one leg 122 can be angled relative to another leg 122 anywhere from an angle greater than 0° and less than less than or equal to 90°. Each side can be configured with one, multiple or many legs 122 that are angled relative to each other for providing enough support and rigidity between the base 110, pad 114 and top 112. Legs 122 can be planar, convex or concave, where planarity, convexity and concavity extend partially or completely from the base 110 to the top 112. Connecting portions between legs 122 can be chamfered, beveled, curved, or pointed. A single conical shaped leg 122 can be configured between the top 112 and the base 110. A conical leg 122 could be angled relative to vertical, ranging from 2°-4°, 3°-6°, 4°-8°, 2°-7°, and 4°-10°. In one aspect, legs 122 can be configured to extend at an angle relative to vertical, ranging from 4.5°-4.8°. Legs 122 can be configured to a desirable length resulting in a desirable overall height of the stand 100. Legs 122 can be welded together at side edges 130 or cast together. Legs 122 can be welded to base 110 or cast together with pad 114. The surface 124 of legs 122 can be perforated with one or more holes 126 for reducing the weight of legs 122 and support stand 100. Holes 126 can be ornamental or non-ornamental. Ornamentation from holes 126 can include information about the manufacturer, owner, seller, and features of the support stand 100. Ornamentation from holes 126 can include information indicating a brand, trade dress and provider/manufacturer details. Legs 122 can be configured to have a continuity of material from the base 110 to the top 112 without holes 126. In one aspect, legs 122 have an opening 128 with a bottom edge 148 and top edge 150. The opening 128 can be spaced equidistant between the base 110 and top 112. In one aspect, legs 122 have an opening 128 spaced equidistant between the opposing side edges 130. In one aspect, legs 122 have an opening 128 spaced equidistant between both the base 110 and top 112 and both the opposing side edges 130. Legs 122 can include one, multiple of many openings 128 of the same, similar or different size, which are spaced equidistantly or non-equidistantly from top 112 and base 110 Legs 122 can be constructed from aluminum or other castable or non-castable alloys and metals. Legs can be constructed from two or more different types of materials, one part of legs 122 being metal and another part of legs 122 being non-metal, such as a moldable rubber or plastic. In another aspect, legs 122 can be constructed from a composite material.

The support stand 100 can include one or more ribs 144 for providing additional support and structural rigidity to the stand 100, such as the base 110, pad 114, protrusions 120, legs 122, central opening 128, top 112, and pad 132. Ribs 144 can be attached between legs 122 and base 110. Ribs 144 can be attached between legs 122 and protrusions 120. Ribs 144 can be attached between one or more legs 122. Ribs 144 can be attached between base 110 and top 112. Ribs can be attached between legs 122 and top 112. Ribs 144 can be attached between legs 122 and pad 132. Ribs can be attached between legs 122 and a shelf. Ribs 144 can be attached between legs 122 and the shelf. Ribs 144 can be configured to a desirable length resulting in a desirable structural support and rigidity to the stand 100 and any part of the stand 100. Ribs 144 can be welded together or cast together with any part of the stand 100. Ribs 144 can be welded to any part of the stand 100 or cast together with any part of the stand 100. Ribs 144 can be positioned internally or externally of the top 112, legs 122 and base 110. Ribs 144 can be positioned to control the seating depth or the gap 152 between stacked support stands 100, thereby controlling the distance between top surface 140 of one stand 100 and the bottom surface 141 of another stand 100 when stacked together. Ribs 144 can also be positioned to control the seating depth or the gap 152 between stacked support stands 100, thereby controlling the distance between top pad 114 of one stand 100 and pad 114 of another stand 100 when stacked together. The surface of ribs 144 can be perforated with one or more holes 146 for reducing the weight of ribs 144 and support stand 100. The holes 146 can be ornamental or non-ornamental. Ornamentation from holes 146 can include information about the manufacturer, owner, seller, and features of the support stand 100. Ornamentation from holes 146 can include information indicating a brand, trade dress and provider/manufacturer details. Ribs 144 can be configured to have a continuity of material without holes 146. Ribs 144 can be constructed from aluminum or other castable or non-castable alloys and metals. Ribs 144 can be constructed from two or more different types of materials, one part of ribs 144 being metal and another part of ribs 144 being non-metal, such as a moldable rubber or plastic. In another aspect, ribs 144 can be constructed from a composite material.

The support stand 100 includes a pad 132 attached at the top 112 to the legs 122. Pad 132 is configured for contacting the underside of the modular unit 12 for supporting the modular unit 12 above the ground 18. Pad 132 can include a shelf portion that extends peripherally outwardly outside the top 112. Pad 132 is configured to extend peripherally inwardly inside the top 112. Pad 132 can extend both peripherally inwardly and outwardly from the top 112 of stand 100. The shelf portion can terminate in an outer edge 136 that extends peripherally outwardly away from the top 112 for supporting and stabilizing modular unit 12. The shelf portion can terminate in an outer edge 136 that extends peripherally outwardly away from the top 112 for stacking purposes where the shelf portion creates an interference with the central opening 128 or legs 122 of another stand 100 to control the seating depth of one support stand 100 inserted into another support stand 100 through base 110, or in other words, where one support stand 100 is stacked on top of another support stand 100. Pad 132 may be non-continuous and thereby configured to terminate in an inner edge 138 that extends peripherally inwardly away from the top 112 for supporting and stabilizing modular unit 12. In one aspect, outer edge 136 is separated from the top 112 by a constant distance. In another aspect, the distance between top 112 and outer edge 136 varies about the periphery of the top 112. In one aspect, inner edge 138 is separated from the top 112 by a constant distance. In another aspect, the distance between top 112 and inner edge 138 varies about the periphery of the top 112. In one aspect, pad 123 does not include the inner edge 138 whereby the top surface 140 and bottom surface 141 of the pad 132 extends continuously between the outer edges 136. The outer edge 136 can terminate contiguous with the top 112 or extend outwardly from the top 112 as described. Similarly, the inner edge 138 can terminate contiguous with the top 112 or extend inwardly from the top 112 as described, in both the continuous and non-continuous manner. Pad 132 may be a continuous pad occupying and extending from an entirety of the top 112. Pad 132 may be a discontinuous pad occupying and extending from only portions of the top 112. Pad 132 can be configured with three or more sides operably connected to the top 112. Pad 132 can be configured with multiple or many sides connected to the top 112. Pad 132 can be polygonal in shape with sides operably connected to the top 112. Pad 132 can be configured having a generally circular shape, with outer edge 136 forming the outer circumference of pad 132 and inner edge 138 forming the inner circumference of pad 132. Similarly, pad 132 can be a spherical or oblong shape, with the outer edge 136 forming the outer circumference of pad 132 and the inner edge 138 forming the inner circumference of pad 132. A portion of the inner edge 138 can be configured to extend inwardly further than or the same distance as other portions of the inner edge 138 about the periphery of the top 112. In one aspect, one or more interference components, such as protrusion(s) 142 may be configured to extend inwardly from the top 112 for controlling the mating of stands 100 with the underside of modular unit 12. Protrusion(s) 142 can also provide additional support to the top 112 during use by providing additional surface area in contact with the underside of modular unit 112. A continuous pad 132 can be configured for mating the entire top surface 140 against the underside of modular unit 12 for providing additional support for the top surface 140 carrying the load from the weight of the modular unit 12. Pad 132 can also include one or more openings 143 in top surface 140 and bottom surface 141 of pad 132 at top 112 for engaging the underside 22 of the modular unit 12. Pad 132 can also include one or more reinforcements, such as thicker walls or portions at the top 112 (e.g., see FIG. 17) in top surface 140 and bottom surface 141 of pad 132, or more generally at top 112, for engaging and supporting the underside 22 of the modular unit 12. Pad 132 can be constructed from aluminum or other castable or non-castable alloys and metals. Pad 132 can be constructed from two or more different types of materials, one part of pad 132 being metal and another part of pad 132 being non-metal, such as a moldable rubber or plastic. In another aspect, pad 132 can be constructed from a composite material.

Figure 7B:
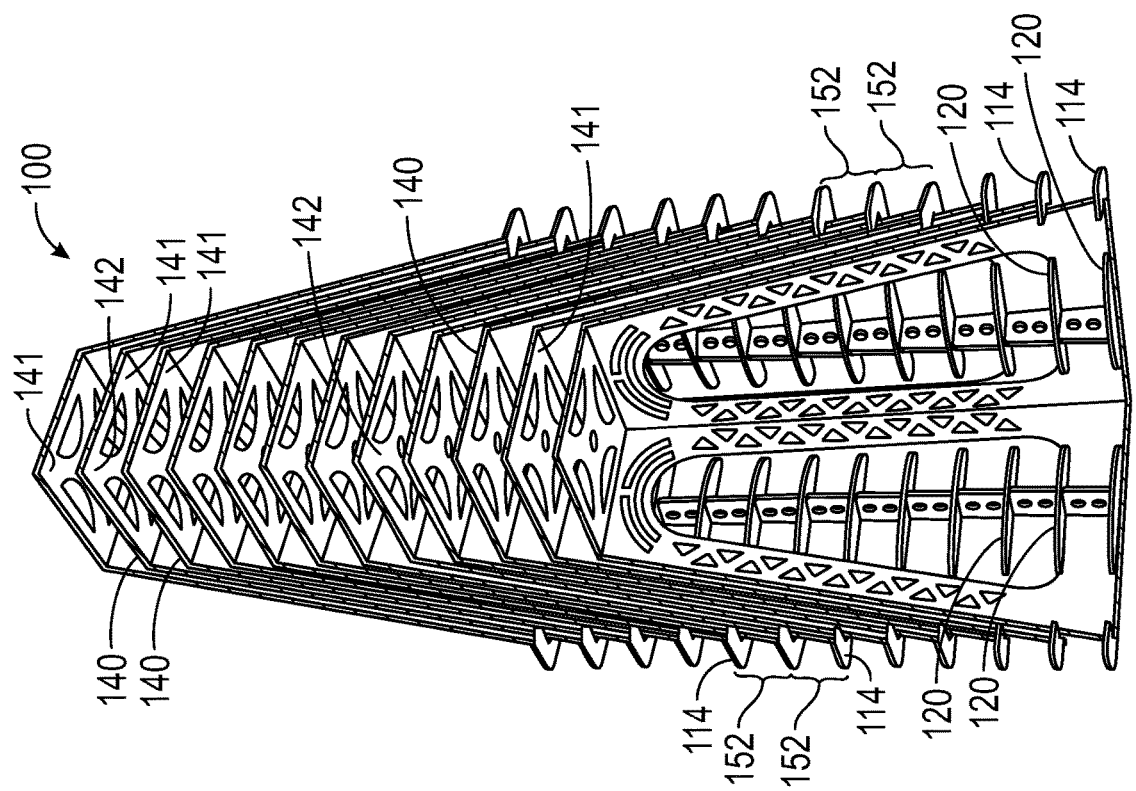
FIG. 7B is a cutaway view of the stacked support stands shown in FIG. 7A.
Figure 7A:
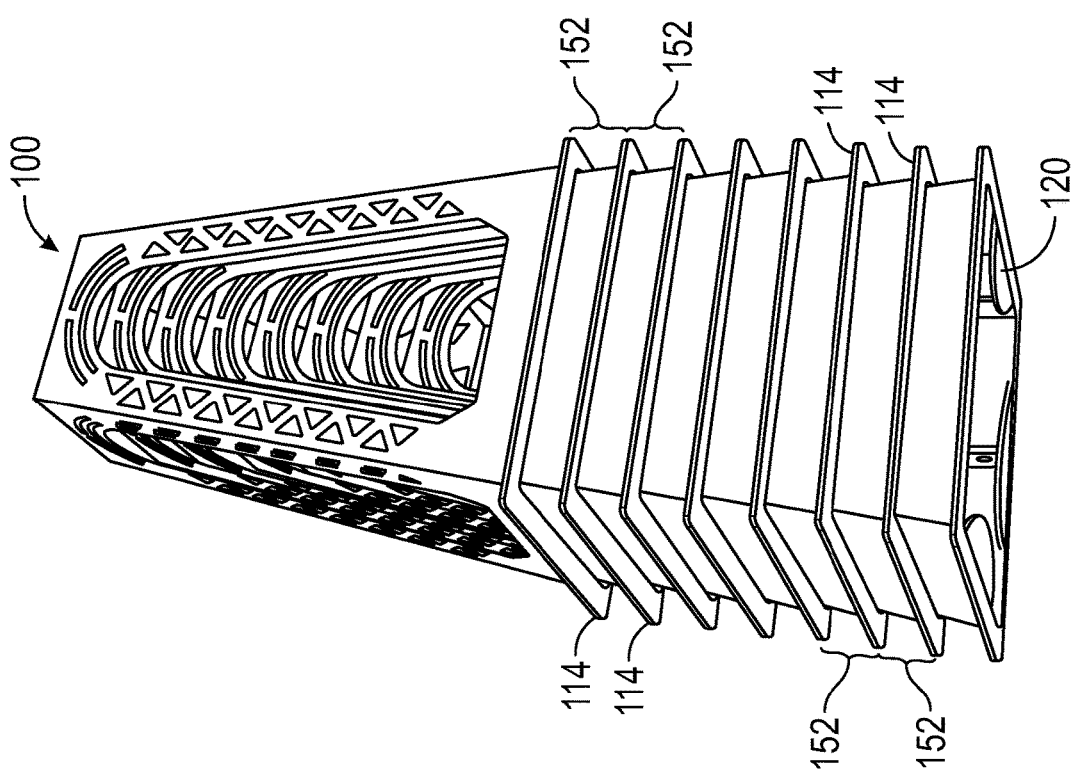
FIG. 7A is a perspective view of stacked support stands.
Figure 10:
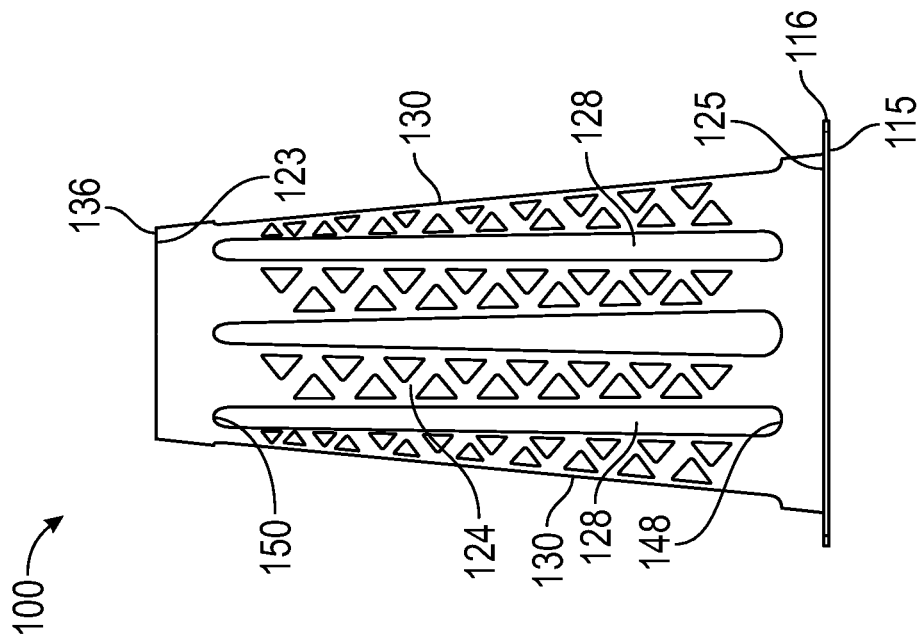
FIG. 10 is a front side view of the support shown in FIG. 9 with the other sides being a mirror image.
Figure 9:
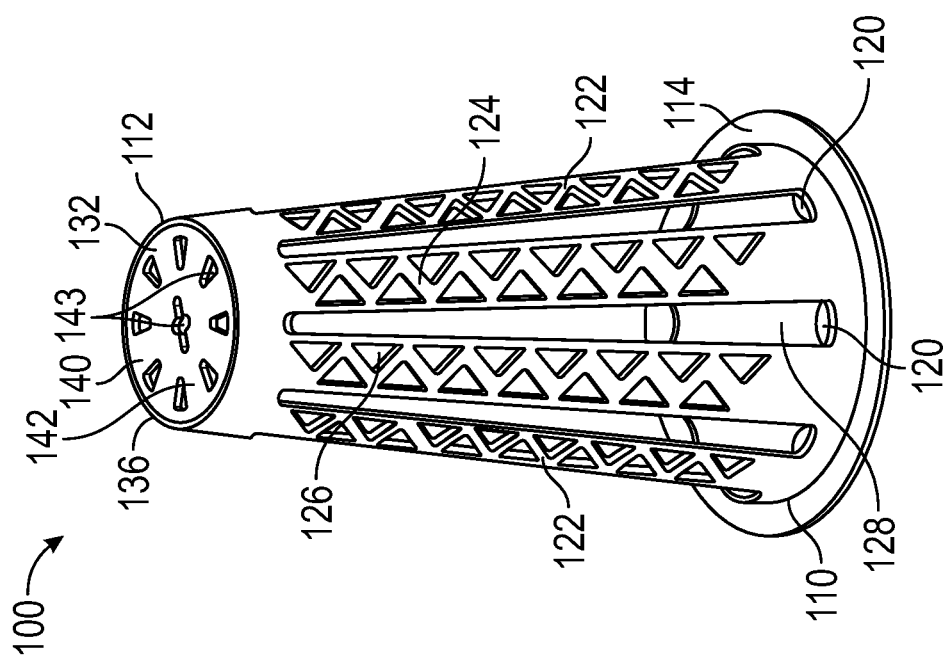
FIG. 9 is a perspective view of a support stand in accordance with another illustrative aspect of the disclosure.
Figure 11A:
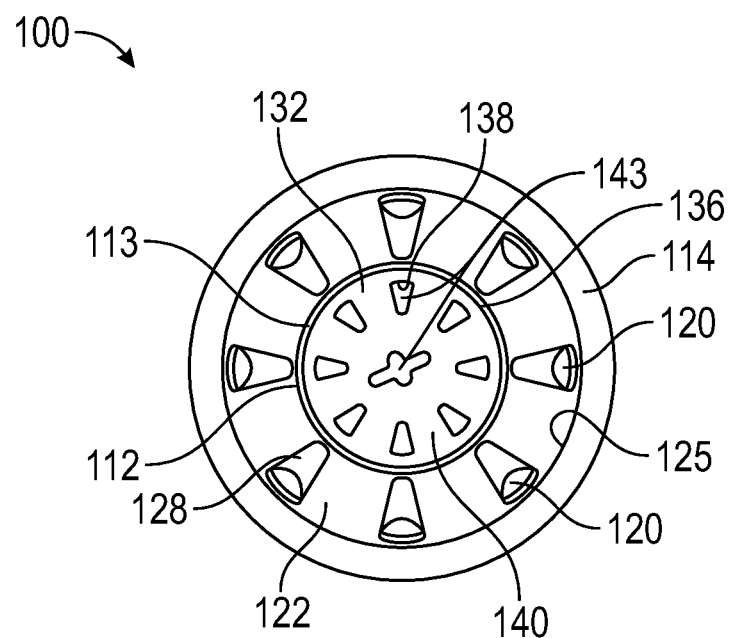
FIG. 11A is a top view of the support shown in FIG. 9.
Figure 11B:
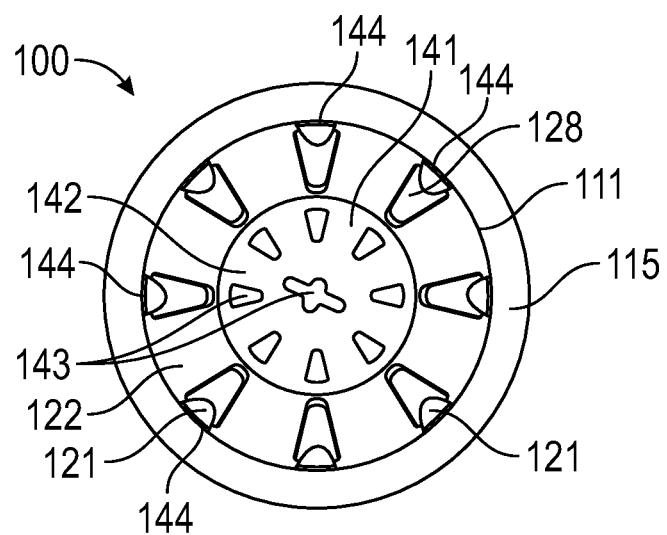
FIG. 11B is a bottom view of the support stand shown in FIG. 9.
Figure 12B:
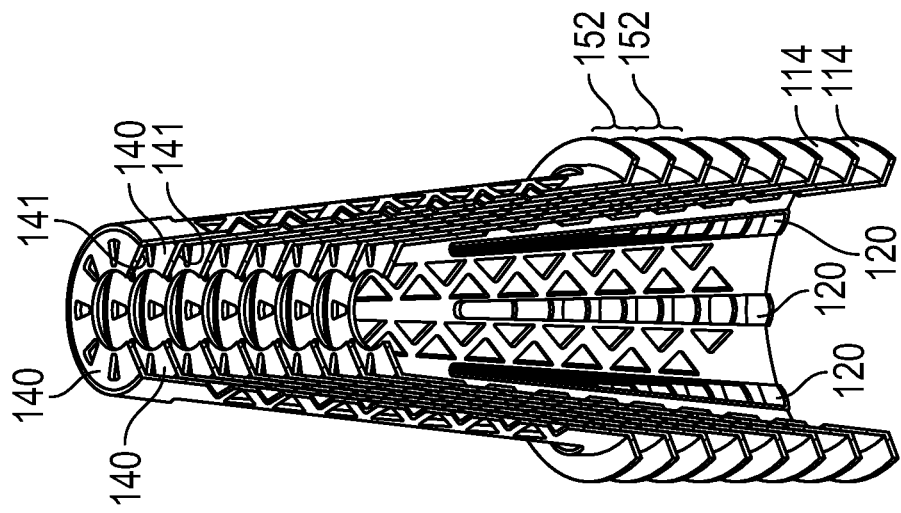
FIG. 12B is a cutaway view of the stacked support stands shown in FIG. 12A.
Figure 12A:
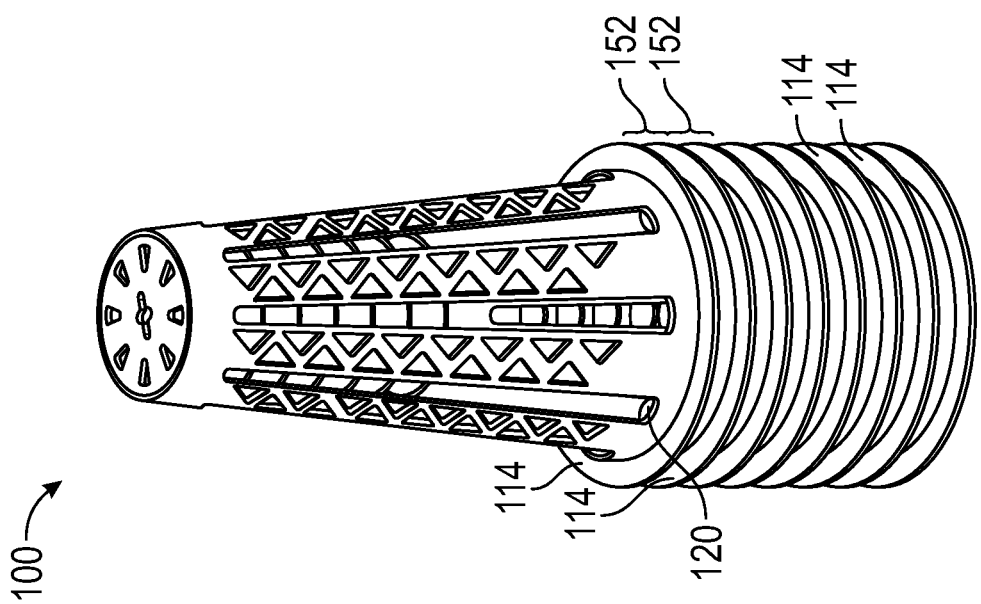
FIG. 12A is a perspective view of stacked support stands.
Figure 13:
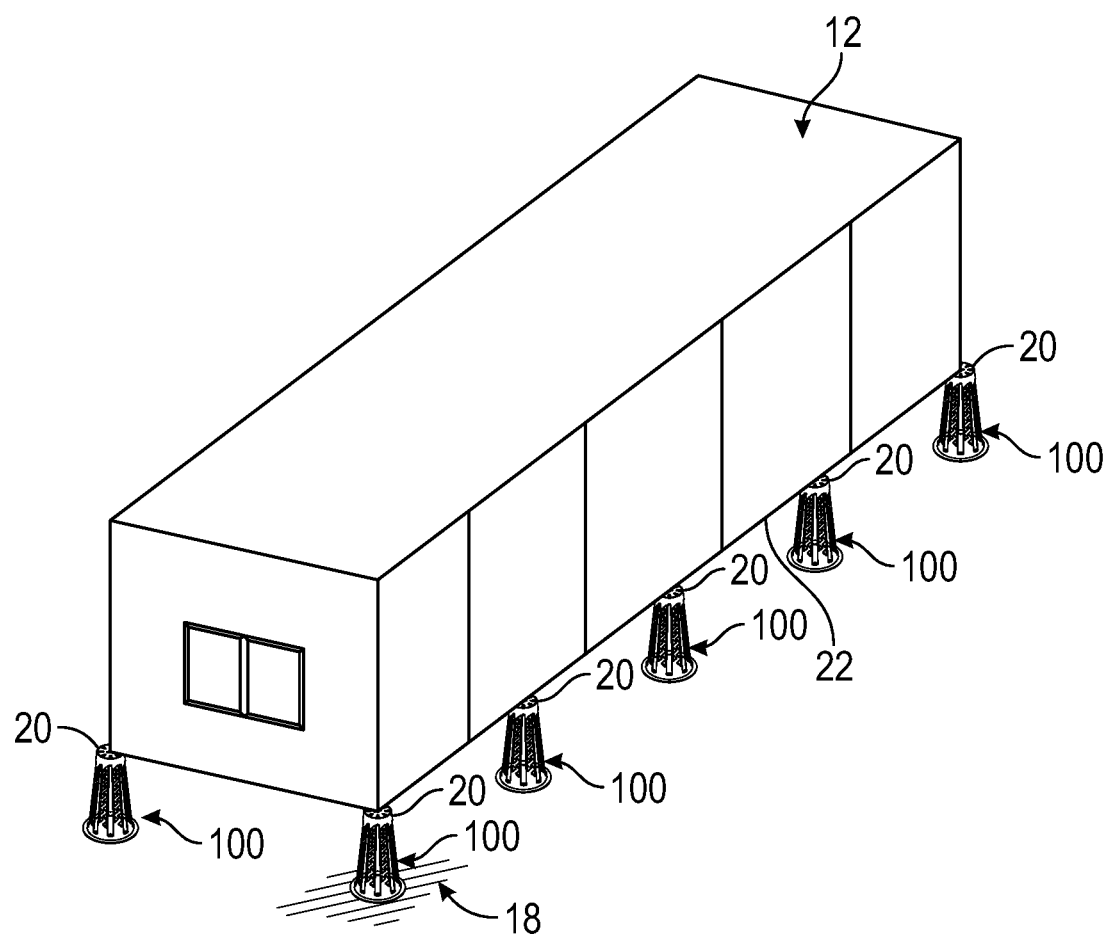
FIG. 13 is a perspective view of a plurality of support stands supporting a modular unit above a surface.
Figure 14:
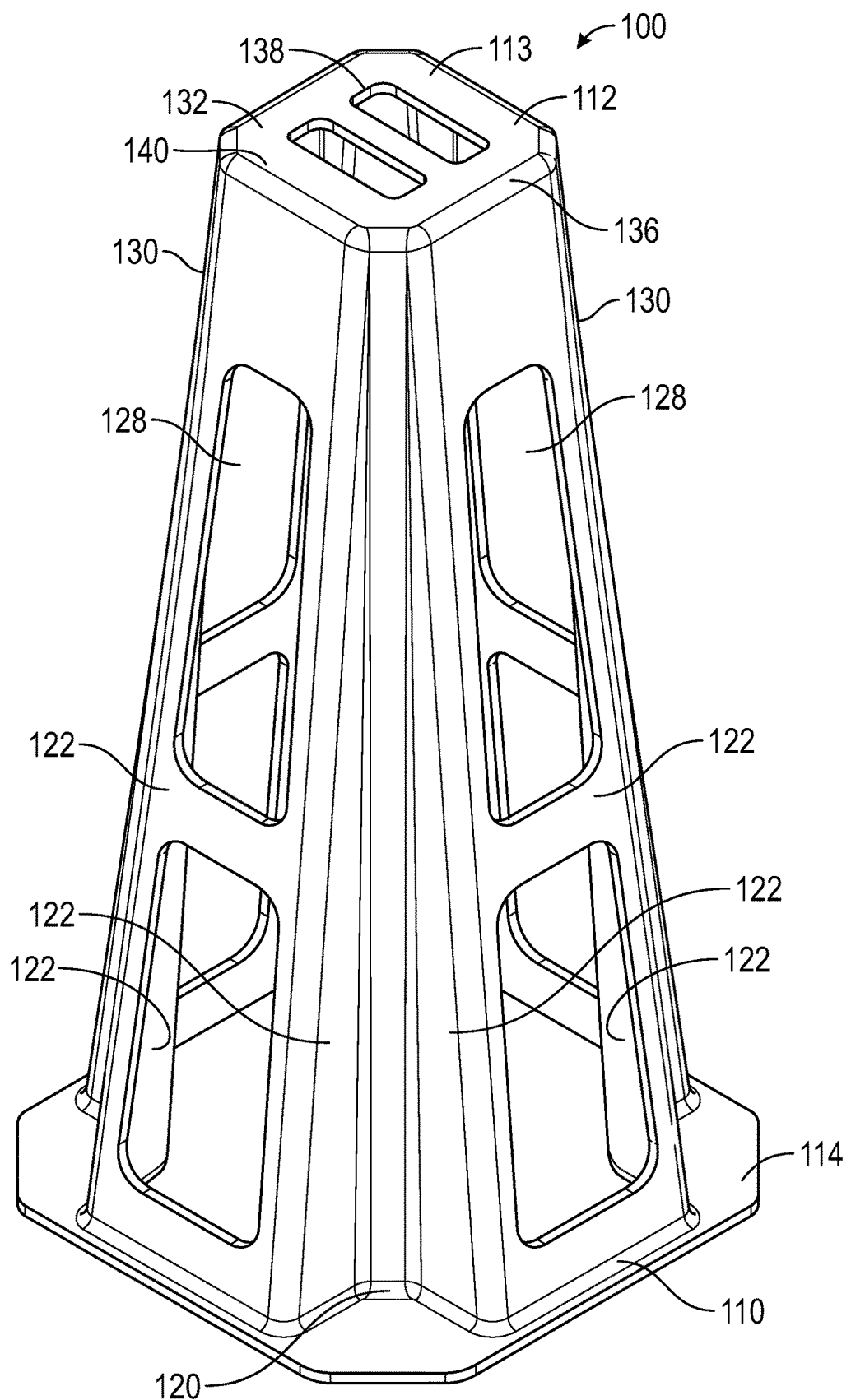
FIG. 14 is a perspective view of a support stand in accordance with another illustrative aspect of the disclosure.
Figure 15:
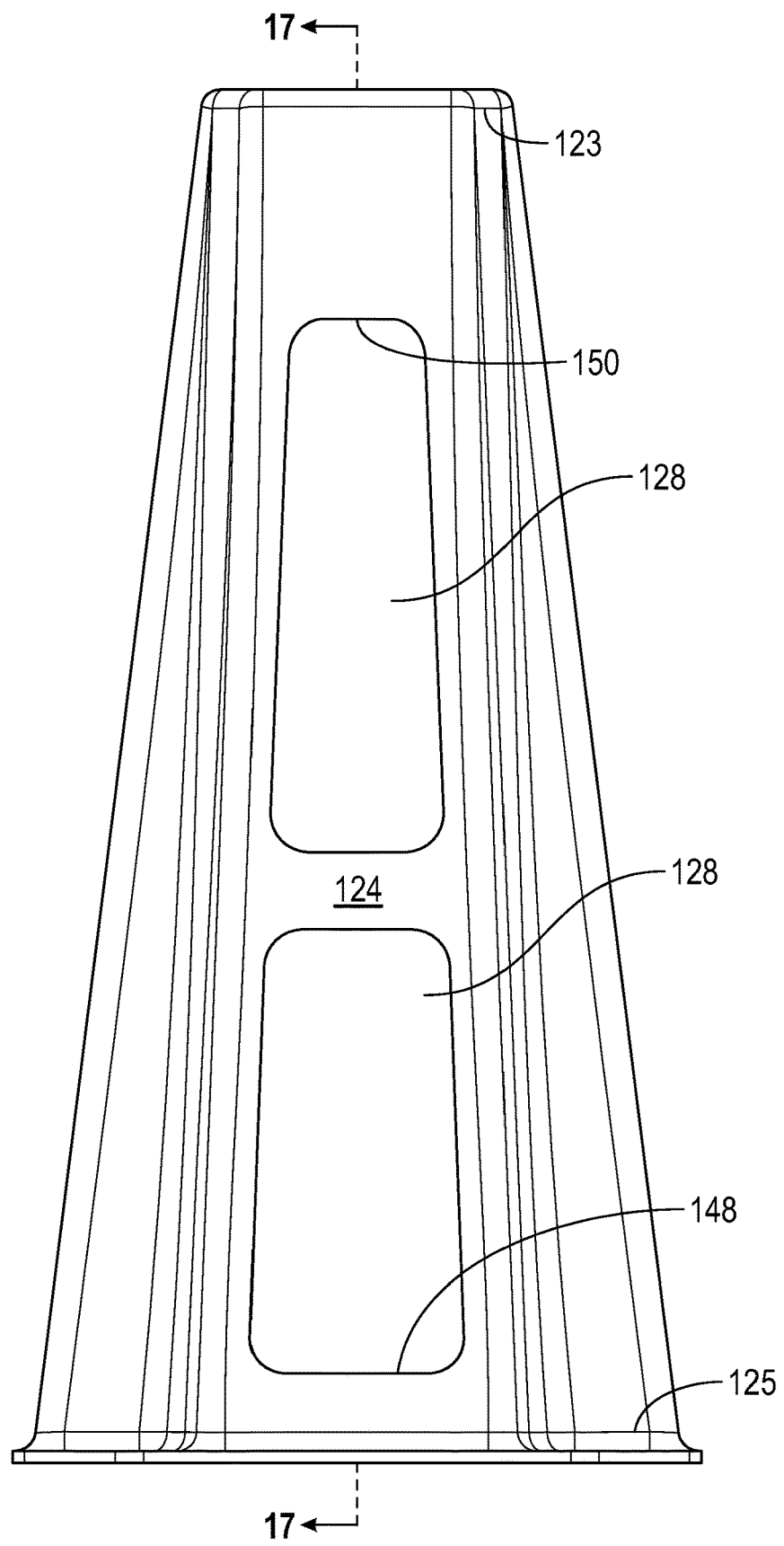
FIG. 15 is a front side view of the support shown in FIG. 14 with the other side views being a mirror image.
Figure 16A:
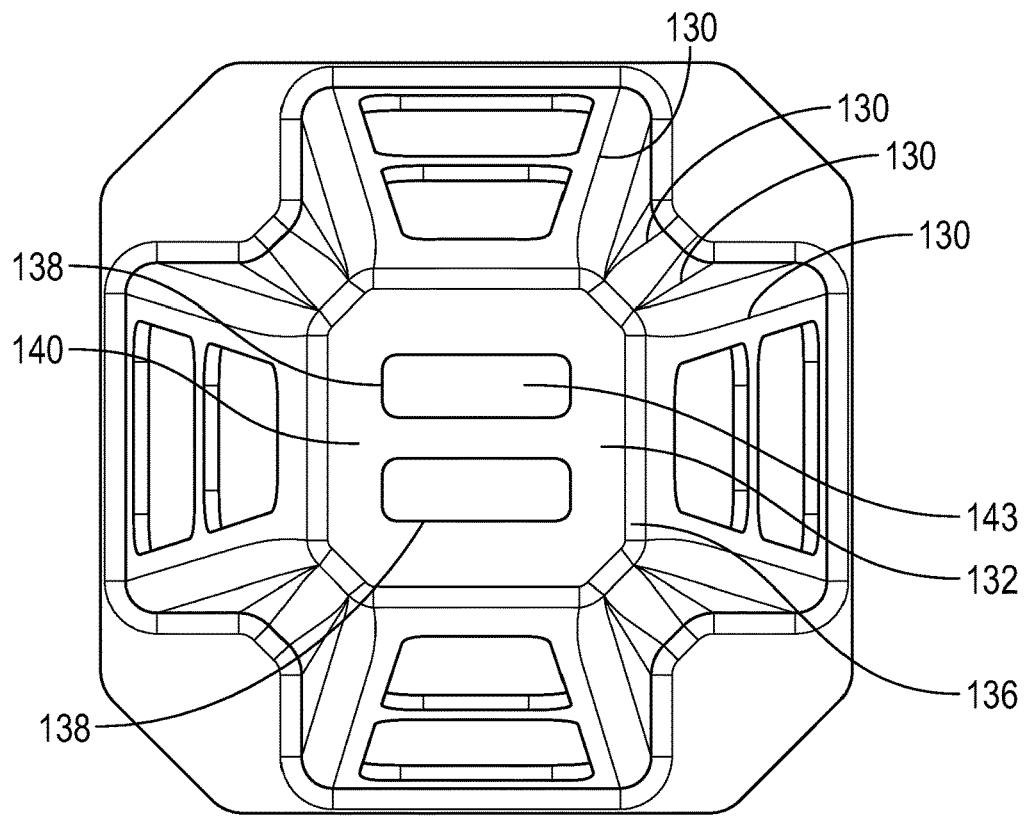
FIG. 16A is a top view of the support shown in FIG. 14.
Figure 16B:
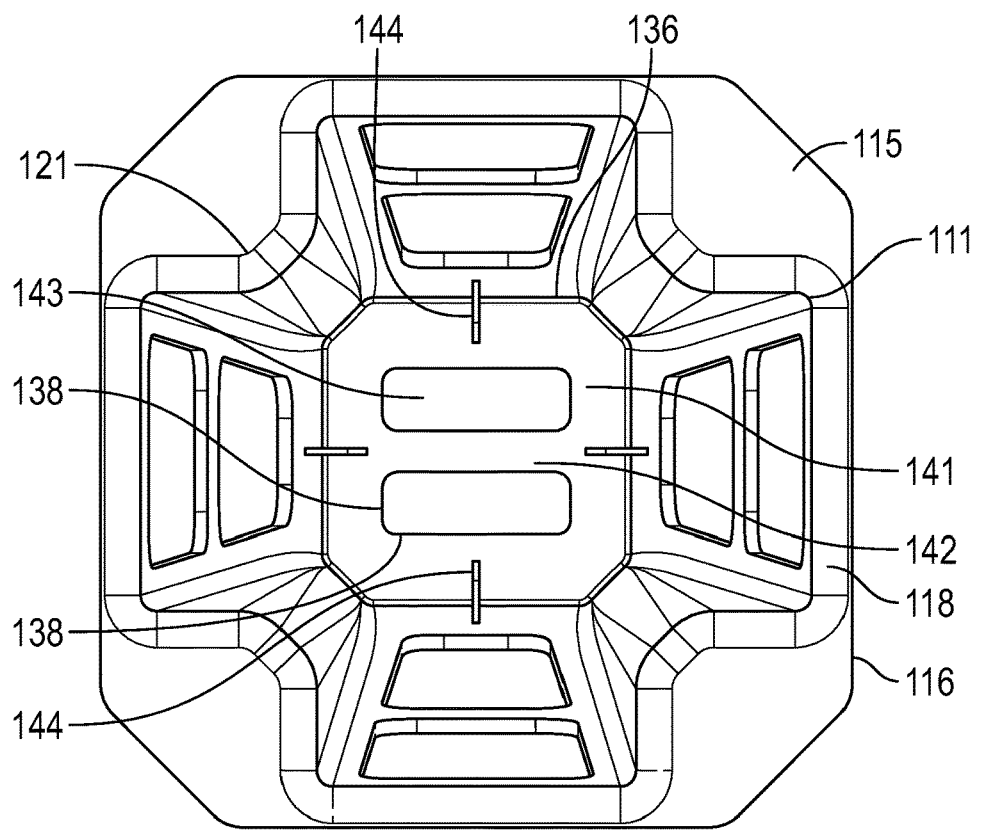
FIG. 16B is a bottom view of the support stand shown in FIG. 14.
Figure 17:
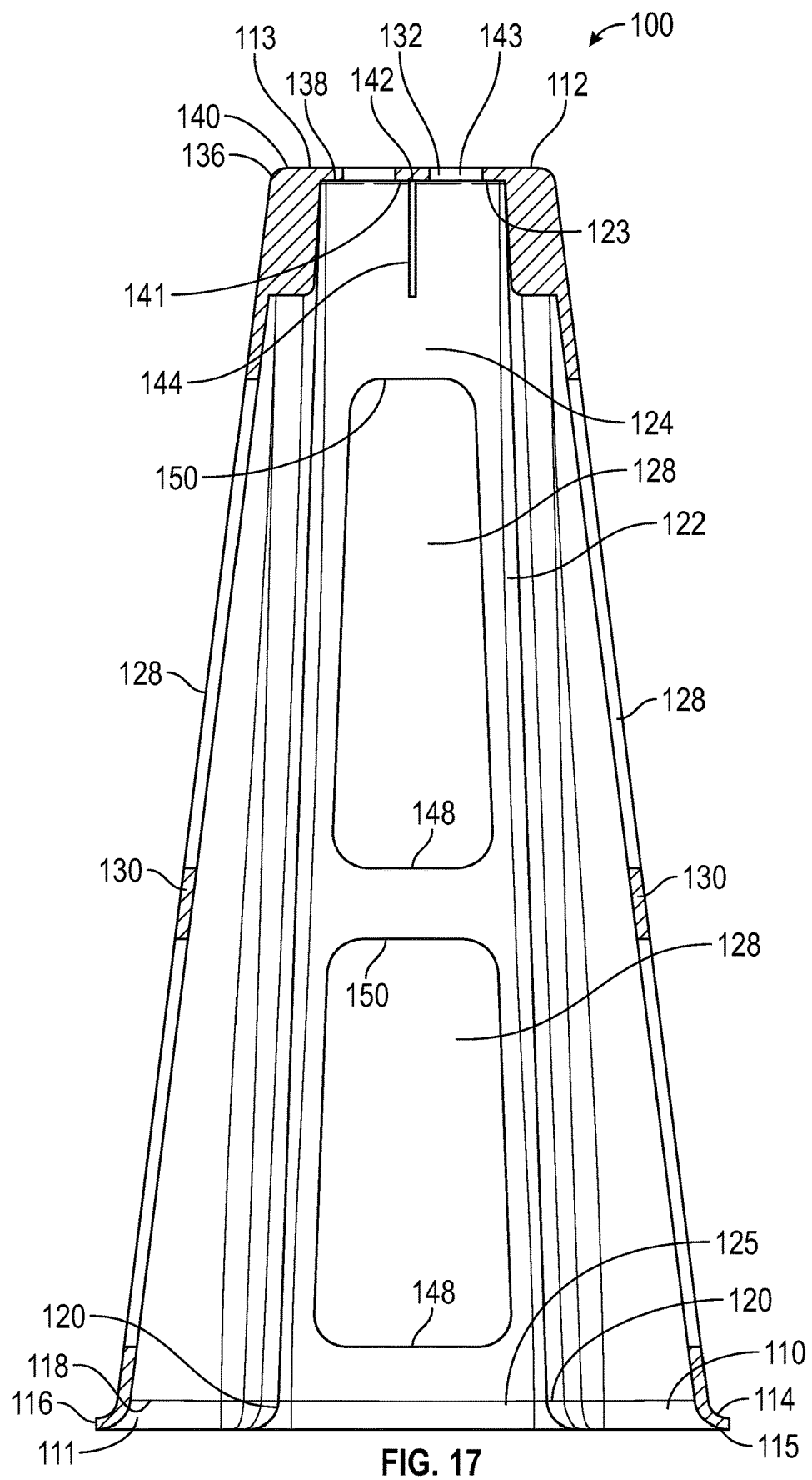
FIG. 17 is a sectional view taken along line 17-17 in FIG. 15.
Figure 18B:
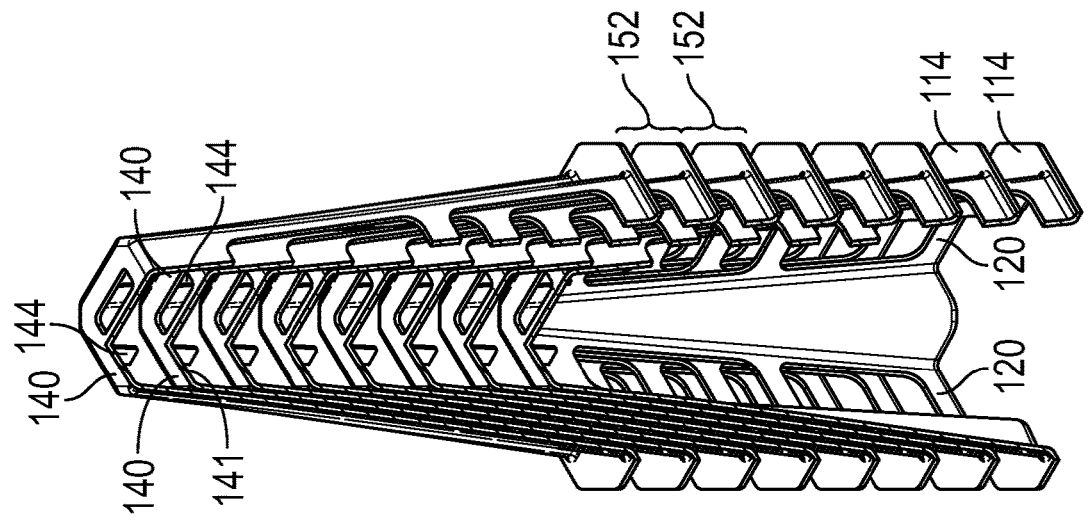
FIG. 18B is a cutaway view of the stacked support stands shown in FIG. 18A.
Figure 18A:
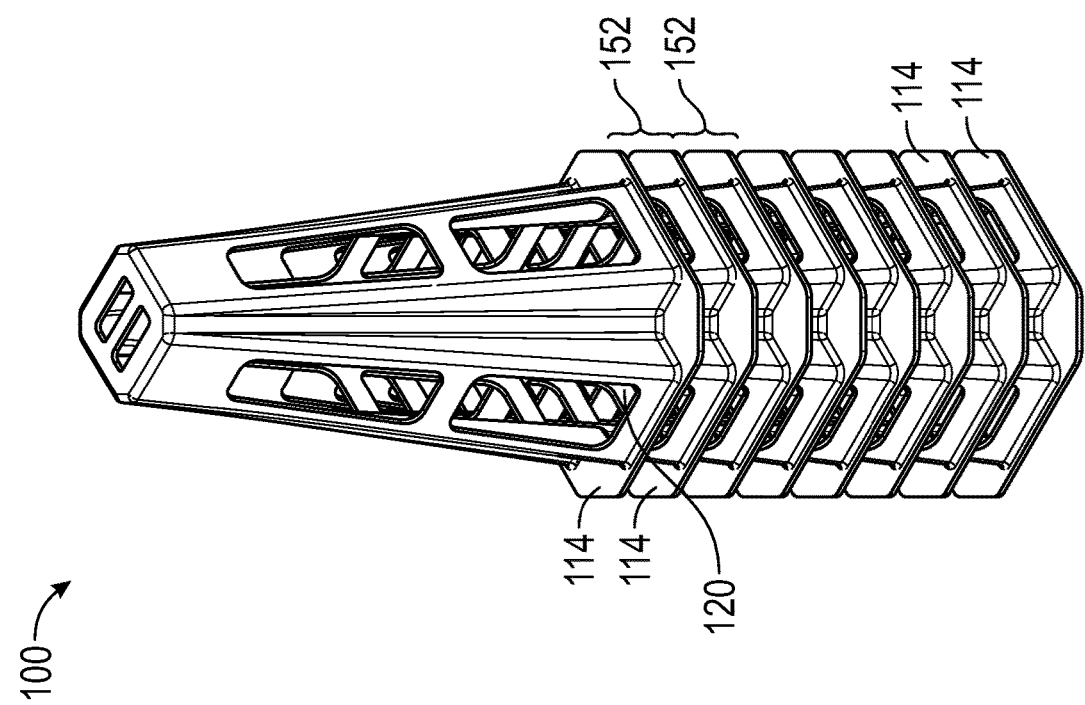
FIG. 18A is a perspective view of stacked support stands.
Figure 19:
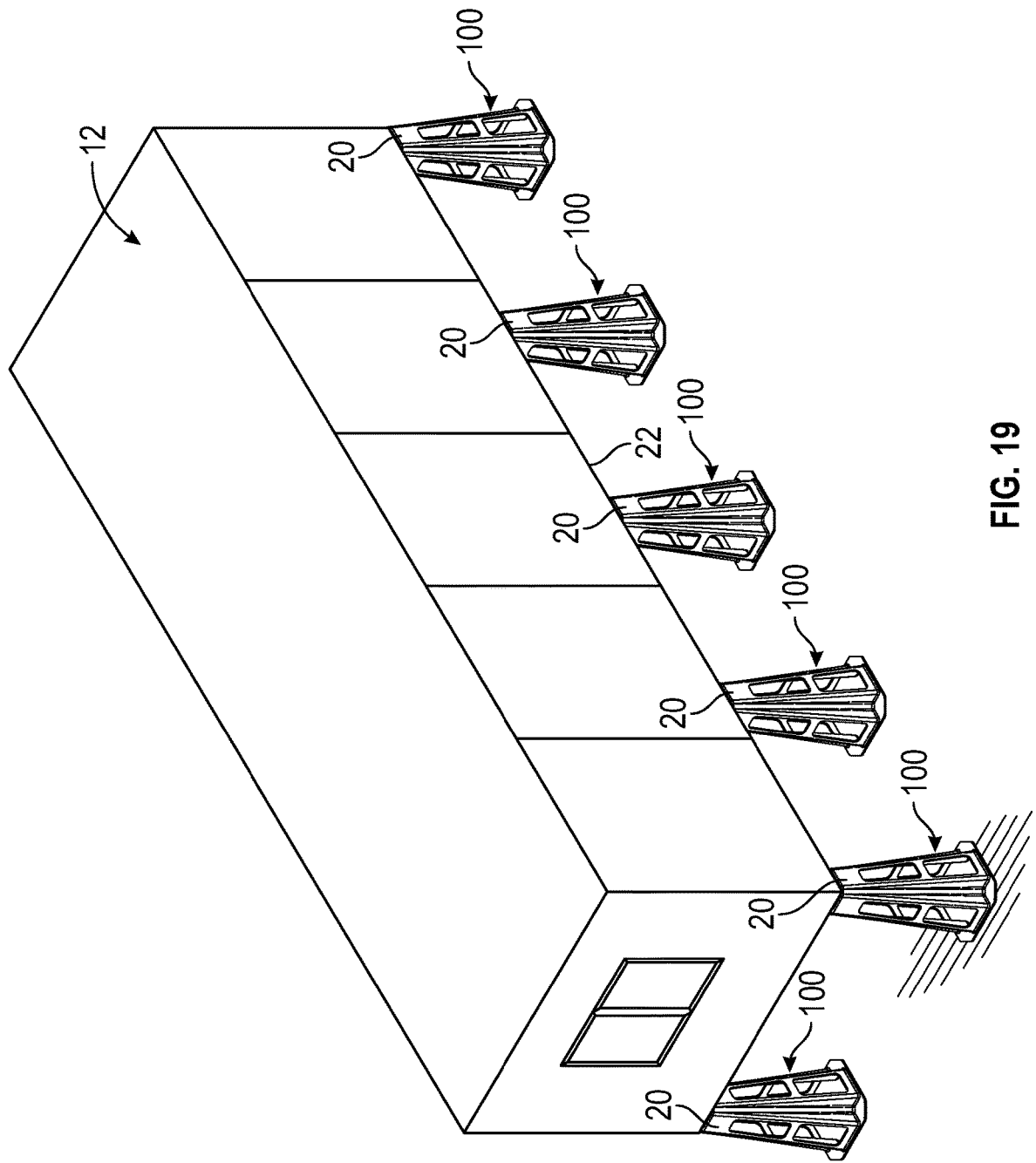
FIG. 19 is a perspective view of a plurality of support stands supporting a modular unit above a surface.

The support stand 100 disclosed pictorially in the figures illustrates supporting a modular unit 12 above the ground 18. As discussed in the detailed description, the support stand 100 includes a top 112, such as a top portion, that includes a top surface 113 for contacting and supporting an underside 22 of the modular unit 12 above the ground 18. The top 112 or top portion has a top perimeter defined by outer edges of the top 112. The support stand 100 also includes a bottom 110 or a base, such as a bottom portion or a base portion, that includes a bottom surface 111 for supporting the top portion 112 at an elevation above the ground 18 against the underside 22 of the modular unit 12. The bottom 110 portion has a bottom perimeter larger than the top perimeter of top 112 portion. The support stand 100 also includes an elevating portion, such as legs 122, that include a top side 123 connected to the top 112 portion, a bottom side 125 connected to the bottom portion or base 110, and an elevating span, such as surface 124, between the top side 123 and the bottom side 125. An opening 128 or a plurality of openings can be included in the elevating portion, such as legs 122, extending generally between the top side 123 and the bottom side 125. The opening 128 or plurality of openings have a bottom edge 148 and a top edge 150. A pad 114 can be connected to the base 110, such as the bottom portion. The pad 114 includes a bottom surface 115 for contacting and supporting the base 110, such as the bottom portion, against the ground 18. The pad 114 has a width defined between an inner edge 118 resulting in an inner pad perimeter and an outer edge 116 resulting in an outer pad perimeter. The support stand 100 can also include one or more interference components, such as a protrusion 120 or one or more protrusions 120 extending inwardly from the inner edge 118 or the inner pad perimeter. The protrusion 120 or the one or more protrusions 120 include a bottom surface 121 for contacting and supporting the base 110, such as the bottom portion, against the ground 18 during use and for contacting the bottom edge 148 of the opening 128 when two or more support stands 100 are stacked together one 100 on top of the other 100, or one support stand 100 inserted into another support stand 100. A stacking configuration of two or more support stands 100 includes a substantial portion of the leg(s) 122, such as the elevating portion, of one support stand 100 being received within a substantial portion of the leg(s) 122, such as the elevating portion, of another support stand 100 whereby a space or gap 152 resides between the staked support pads 100, such as between the pad 114 of each support stand 100, controlled, for example, by protrusion 120 of the one support stand 100 engaging the bottom edge 148 of the opening 128 of the other support stand 100. The space or gap 152 controlled by the protrusion 120 also creates a space or gap between the bottom surface 141 and top surface 140 of a support stands 100 that are stacked together, as best illustrated in FIGS. 7B and 12B. The outer edge 116, resulting in the outer pad perimeter, is greater than the base 110 perimeter or bottom perimeter. The inner edge 118, resulting in the inner pad perimeter, is less than the base 110 perimeter or bottom perimeter. The support pad is preferably configured with the top surface 113 or pad 132 being parallel with the base 110 such as the bottom surface and the pad 114. The support stand 100 is also configured so that the underside and weight of the modular unit 12 is supported on the top surface 113 or pad 132 of the top 112 or top 112 portion. The support stand 100 can include a rib 144 or a plurality of ribs 144, such as one or more structure or structural supporting ribs, connected between the legs 122, such as the elevating portion, and the protrusion 120, plurality of protrusions 120 or one or more protrusions 120. The support stand 100 can include a rib 144 or a plurality of ribs 144, such as one or more structure or structural supporting ribs, connected between the legs 122, such as the elevating portion, and the pad 114. The legs 122, such as the elevating portion, can be configured to include a pair of opposing legs 122, each with the opening 128. The support stand 100 or the leg(s) 122, such as the elevating portion, can be frustoconical in shape. The elevating portion formed from leg(s) 122 can be configured to include three or more legs 122. The support stand 100 can also include one or more openings 143 in top surface 140 and bottom surface 141 of pad 132 at top 112 for engaging the underside 22 of the modular unit 12. Surfaces 111, 113, 121, 124, 140, 141 can include holes 126, a plurality of holes 126 or a single hole 126 for weight reduction. In some instances, for example, such as in the case of the top surface 140, holes 126 can, in addition to providing weight reduction, provide an opening 143, a plurality of openings 143, or one or more openings 143 for matingly engaging modular support points 20 on the underside 22 of modular unit 12.

Figure 20:
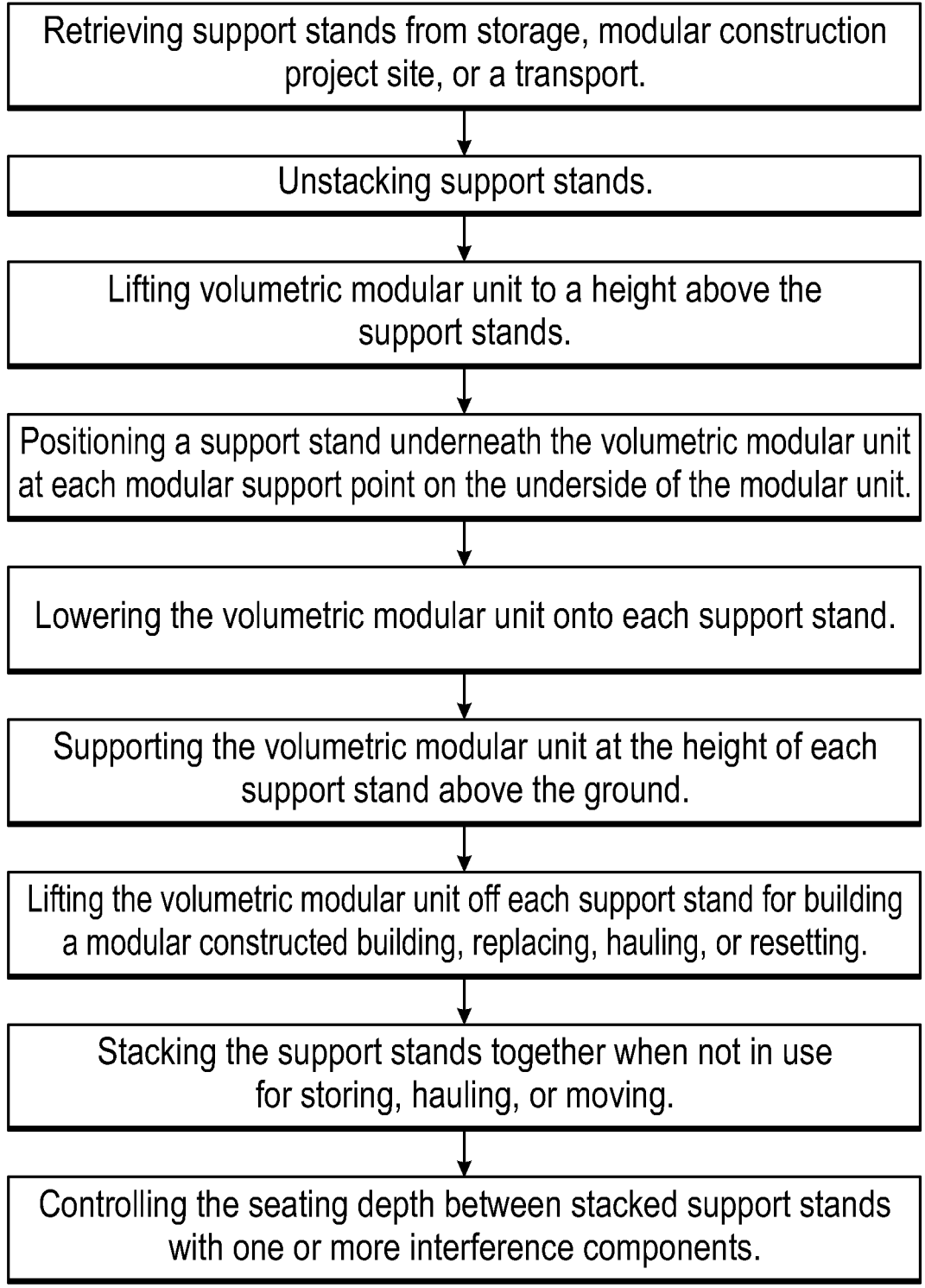
FIG. 20 is a flow chart describing a method for temporarily storing a volumetric modular unit on a support stand.

The present disclosure also provides a method, as provided by way of example in FIG. 20, for temporarily supporting a volumetric modular unit 12 above the ground 18 with a plurality of support stands 100 and stacking the plurality of support stands 100 when not supporting the volumetric modular unit 12. The process or method is made possible with a support stand 100 having a top 112 with a top surface 113, a bottom or base 110 having a bottom surface 111, an elevating portion or legs 122 having a top side 123 connected to the top 112, a bottom side 125 connected to the bottom or base 110, and an elevating span or surface 124 between the top side 123 and the bottom side 125. The top 112 has a top perimeter and the bottom or base 110 has a bottom perimeter larger than the top perimeter. The method or process of temporarily supporting a volumetric modular unit 12 above the ground 18 with a plurality of support stands 100 and stacking the plurality of support stands 100 when not supporting the volumetric modular unit 12 includes, for example, lifting the volumetric modular unit 12 to an elevation above the ground 18 at a height above the support stand 100. Support stands 100 can be retrieved by unstacking a plurality of the support stands 100 from the stacked formations shown in FIGS. 7A-7B, 12A-12B, and 18A-18B. A support stand 100 is placed underneath the volumetric modular unit 12 at each modular support point 20 with the bottom or base 110 or pad 114 of the support stand 100 contacting and supporting the underside 22 of the modular unit 12 above the ground 18. The volumetric modular unit 12 is lowered onto each support stand 100, bringing each modular support point 20 into supporting contact with the top surface 113 of each support stand 100 for supporting the volumetric modular unit 12 on the top surface 113 of each support stand 100 above the ground 18. In this manner, a volumetric modular unit 12 is supported at the height of each support stand 100 above the ground 18. The volumetric modular unit 12 is lifted off each support stand 100 for building a modular constructed building 24. After the volumetric modular unit 12 is lifted of the support stands 100 the plurality of support stands 100 can be stacked together, as shown in FIGS. 7A-7B, 12A-12B, and 18A-18B, by inserting a substantial portion of the elevating portion or leg(s) 122 of one support stand 100 into a substantial portion of the elevating portion or leg(s) 122 of another support stand 100 until reaching a seating depth, controlled for example, by bottom edge(s) 148 of one (i.e., the inserted support stand 100) support stand 100 contacting protrusion(s) 142 of the other (i.e., the receiving support stand 100) support stand 100.

The invention is not to be limited to the particular aspects described herein. In particular, the disclosure contemplates numerous variations in a support stand 100 that is stackable, reusable, quickly deployable, easily transportable, thereby facilitating temporary or longer term support for supporting a volumetric modular unit 12 above a surface, such as the ground 18, as best illustrated in FIGS. 4-20. The foregoing description has been presented for purposes of illustration and description. It is not intended to be an exhaustive list or limit any of the invention to the precise forms disclosed. It is contemplated that other alternatives or exemplary aspects are considered included in the disclosure. The description is merely examples of embodiments, processes or methods of the invention. It is understood that any other modifications, substitutions, and/or additions can be made, which are within the intended spirit and scope of the disclosure.

What is claimed is:

1. A method for temporarily supporting a volumetric modular unit above the ground, the method comprising:
   providing a support stand having a top surface, an open bottom surface, and a hollow interior space bounded by the top surface and sidewalls interdisposed between the top surface and the bottom surface, wherein the top surface has a top perimeter and the open bottom surface has a bottom perimeter larger than the top perimeter of the top surface and the sidewalls are attached to the top surface and the open bottom surface, and a concavity disposed between and along adjoining edges of the sidewalls;
   unstacking a plurality of the support stands from a stacked position wherein the top surface and sidewalls of one of the plurality of support stands is received through the open bottom surface and disposed within the hollow space of an adjoining one of the plurality of stands for compactly transporting and storing the plurality of support stands;
   lifting the volumetric modular unit to an elevation above the ground and a height above the support stand;
   placing a support stand underneath the volumetric modular unit at each modular support point with the top surface of the support stand positioned for contacting and supporting an underside of the modular unit above the ground;
   lowering the volumetric modular unit onto each support stand, bringing each modular support point into supporting contact with the top surface of the support stand; and
   supporting the volumetric modular unit at the height of each support stand above the ground.

2. The method of claim 1, wherein the top perimeter is attached directly to top sides of the sidewalls.

3. The method of claim 1, further comprising:
   providing at least three sidewalls;
   providing at least three edges of the top perimeter of the top surface;
   wherein the at least three edges of the top perimeter of the top surface are directly attached to the at least three sidewalls.

4. The method of claim 1, further comprising:
   providing at least four sidewalls;
   providing at least four edges of the top perimeter of the top surface;
   wherein the at least four edges of the top perimeter of the top surface are directly attached to the at least four sidewalls.

5. The method of claim 1, wherein the top perimeter of the top surface is attached directly to and supported by top edges of the sidewalls.

6. The method of claim 1, further comprising:
   providing concave cornerwalls interdisposed between sidewalls, wherein bottom edges of the concave cornerwalls are directly attached to the open bottom surface and top edges of the concave cornerwalls are directly attached to the top surface.

7. A method for temporarily supporting a volumetric modular unit above the ground, the method comprising:
   providing a support stand having a top surface, an open bottom surface, and a hollow interior space bounded by the top surface and sidewalls interdisposed between the top surface and the open bottom surface, wherein the top surface has outer edges attached to top edges of the sidewalls for the top surface to be directly supported by the sidewalls and the open bottom surface having a concavity for contacting the ground;
   unstacking a plurality of the support stands from a stacked position wherein the top surface and sidewalls of one of the plurality of support stands is received through the open bottom and disposed within the hollow space of an adjoining one of the plurality of stands for compactly transporting and storing the plurality of support stands;
   placing the top surface in a weight supporting position directly beneath an underside of the volumetric modular unit while in-use for supporting the volumetric modular unit on the top surface of each support stand.

8. The method of claim 7, further comprising:
   lifting the volumetric modular unit to a height above the support stand;
   placing a support stand underneath the volumetric modular unit at a modular support point with the top surface of the support stand positioned for contacting and supporting an underside of the modular unit above the ground; and
   lowering the volumetric modular unit onto each support stand, bringing each modular support point into supporting contact with the top surface of the support stand.

9. The method of claim 7, further comprising:
   providing at least three sidewalls;
   providing at least three outer edges of the top surface;
   wherein the at least three edges of the top surface are directly attached to the at least three sidewalls.

10. The method of claim 7, further comprising:
    providing at least four sidewalls;
    providing at least four outer edges of the top surface;
    wherein the at least four edges of the top surface are directly attached to the at least four sidewalls.

11. The method of claim 7, wherein the outer edges of the top surface are attached directly to and supported by top edges of the sidewalls.

12. The method of claim 7, further comprising:
    providing concave cornerwalls interdisposed between the sidewalls, wherein top edges of the concave cornerwalls are attached to the outer edges of the top surface for the top surface to be directly supported by the concave cornerwalls.

13. The method of claim 7, further comprising:
    injection molding or metal casting the support stand.

14. A support stand for temporarily supporting a volumetric modular unit above the ground, the support stand comprising:
    a top surface, an open bottom surface, and a hollow interior space bounded by the top surface and sidewalls interdisposed between the top surface and the open bottom surface for stacking a plurality of the support stands together with the top surface and sidewalls of one of the plurality of support stands disposed within the hollow space of an adjoining one of the plurality of stands for compact transportation and storage of the plurality of support stands, wherein the top surface has outer edges attached to top edges of the sidewalls for the top surface to be directly supported by the sidewalls and the open bottom surface having a concavity for contacting the ground;
    a weight supporting position of the support stand comprises an in-use position having the top surface in supporting contact with an underside of the volumetric modular unit for supporting the volumetric modular unit directly on the top surface of each support stand.

15. The support stand of claim 14, further comprising:
at least three sidewalls;
at least three outer edges of the top surface;
wherein the at least three edges of the top surface are directly attached to the at least three sidewalls.

16. The support stand of claim 14, further comprising:
at least four sidewalls;
at least four outer edges of the top surface;
wherein the at least four edges of the top surface are directly attached to the at least four sidewalls.

17. The support stand of claim 14, wherein the outer edges of the top surface are attached directly to and supported by top edges of the sidewalls.

18. The support stand of claim 14, further comprising:
concave cornerwalls interdisposed between the sidewalls, wherein top edges of the concave cornerwalls are attached to the outer edges of the top surface for the top surface to be directly supported by the concave cornerwalls.

19. The support stand of claim 14, further comprising:
an aperture in the top surface for mating with a modular support point on an underside of the volumetric modular unit.

20. The support stand of claim 14, further comprising:
an aperture in at least one of the sidewalls, wherein the aperture is vertically centered within the sidewall.

* * * * *